United States Patent [19]
Arai et al.

[11] Patent Number: 5,880,533
[45] Date of Patent: Mar. 9, 1999

[54] GENERATOR SYSTEM FOR INTERNAL COMBUSTION ENGINE

[75] Inventors: Hideaki Arai; Kazuyuki Kubo, both of Saitama, Japan

[73] Assignee: Honda Giken Kogyo Kabushiki Kaisha, Tokyo, Japan

[21] Appl. No.: 868,059

[22] Filed: Jun. 3, 1997

[30] Foreign Application Priority Data

Jun. 24, 1996 [JP] Japan .................................. 8-181645

[51] Int. Cl.⁶ .................................................. F02N 11/04
[52] U.S. Cl. ........................ 290/31; 290/22; 290/23; 290/24; 290/25; 290/29; 290/33; 290/46
[58] Field of Search ............................ 290/22, 23, 24, 290/25, 29, 31, 32, 33, 46; 322/29, 45, 47; 180/65 A; 310/68 R, 68 D

[56] References Cited

U.S. PATENT DOCUMENTS

| | | | |
|---|---|---|---|
| 4,019,104 | 4/1977 | Parker | 318/195 |
| 4,165,795 | 8/1979 | Lynch et al. | 180/65 A |
| 4,293,788 | 10/1981 | Binder | 310/227 |
| 4,748,337 | 5/1988 | Raad et al. | 290/31 |
| 4,803,376 | 2/1989 | N'Guyen | 290/22 |
| 4,830,412 | 5/1989 | Raad et al. | 290/31 |
| 4,862,009 | 8/1989 | King | 290/22 |
| 5,039,933 | 8/1991 | Dong | 322/47 |
| 5,083,077 | 1/1992 | Wallace et al. | 322/23 |
| 5,093,591 | 3/1992 | Kitamura et al. | 310/62 |
| 5,495,127 | 2/1996 | Aota et al. | 290/31 |
| 5,512,813 | 4/1996 | Uchinami | 322/28 |
| 5,545,928 | 8/1996 | Kotani | 290/40 C |
| 5,587,647 | 12/1996 | Bansal et al. | 322/45 |
| 5,663,631 | 9/1997 | Kajiura et al. | 322/29 |

FOREIGN PATENT DOCUMENTS 62-33465  7/1987  Japan.

OTHER PUBLICATIONS

Patent Abstracts Of Japan, vol. 16, No. 285 (E–1222), Jun. 24, 1992.

S.G. Jeong & Al.: "Steady state analysis of a stand–alone wound rotor induction generator excited by a pwm inverter", Conference Record of the 1987 IEEE Industry Applications Society Annual Meeting, Oct. 18–23, 1987, Atlanta, Georgia, USA, pp. 790–797.

Primary Examiner—Elvin G. Enad
Attorney, Agent, or Firm—Nikaido, Marmelstein, Murray & Oram LLP

[57] ABSTRACT

There is provided a generator system for internal combustion engines, which can produce power efficiently at all times irrespective of the engine speed even for use in an internal combustion engine operated at variable speeds such as a vehicle engine. An AC generator electronic control unit (ACG.ECU) 3 determines a rotation speed N2 of a rotating electromagnetic field to be generated by a rotor 1R based on a mechanical rotation speed N1 of the rotor 1R in an alternator 1 such that the relative speed N of the rotating magnetic field to a stator 1S agrees with the maximum efficiency speed of rotation Nx. Then the ACG.ECU 3 sends the determined value to a rotating electromagnetic field controller 2a. The rotating electromagnetic field controller 2a controls phases of AC power to be supplied to a three-phase coil 11 of the rotor 1R to generate a rotating electromagnetic field with the rotation speed N2.

14 Claims, 4 Drawing Sheets

GENERATOR SYSTEM FOR INTERNAL COMBUSTION ENGINE

BACKGROUND OF THE INVENTION

1. Field of the Invention

This invention relates to a generator system for internal combustion engines which converts rotational energy into electrical energy and, more particularly, to a generator system for internal combustion engines which can produce electric power efficiently at all times irrespective of the engine speed even for use in an internal combustion engine operated at variable speeds such as a vehicle engine.

2. Description of the Related Art

A generator system for vehicles or ships includes an alternator (AC generator; ACG) with its rotating shaft coupled through an alternator belt to a crank shaft of an engine; a rectifier for converting AC power into DC power, the AC power generated by the alternator according to the engine speed; and a regulator for controlling the voltage level of the DC power according to the voltage at a battery.

FIG. 3 is a schematic diagram showing a structure of a conventional alternator 50, in which a DC field coil 53 is wound around a rotor 52 integrally formed with the rotating shaft and a three-phase coil 55 is wound around a stator 54. In the condition that the DC field coil 53 is excited by supplying direct current from the battery (not shown), the rotor 52 is rotated to create an alternative magnetic field. Consequently, the three-phase coil 55 of the stator 54 generates AC power with a frequency corresponding to the rotation speed of the rotor 52. Such a conventional alternator is an AC generator using a synchronous motor. In some cases, the rotor 52 may be provided with a permanent magnet instead of the DC field coil 53.

In recent vehicles, power consumption has increased because of current tendencies to electrify or electronically control vehicle parts including the engine and to widely use audio and navigation systems. This requires the alternator to increase the capacity of power generation. The electric power generated by the alternator is reduced as its rotation speed drops. It is therefore necessary to increase the ratio of the alternator speed to the engine speed so that sufficient generated power can be obtained even at low engine speeds such as 1000 r.p.m or less. In many cases, the pulley ratio is set twice or more for that purpose.

On the other hand, high velocity revolution and low idling of the engine is accelerated as the engine output and efficiency increase. For this reason, the ratio of the minimum and maximum engine speeds is becoming larger. When the pulley ratio is set higher for the electric power required at low engine speeds, the alternator speed tends to exceed the maximum rate determined from mechanical restrictions in high velocity revolution. This also causes increased fan noise at high revolution of the engine and hence degradation of the engine. Further in the generator system for vehicles, since the crank shaft of the engine and the rotating shaft of the alternator are coupled by the alternator belt at all times, rotation losses in the alternator (e.g., belt driving torque and/or cooling fan resistance) occurs even when the alternator is not required to generate electric power due to fully charged battery. This causes lowered engine efficiency or increased fuel cost.

As previously discussed, the conventional generator system for internal combustion engines operated at variable speeds such as vehicle engines can not take a highly set ratio of the alternator speed to the engine speed from the point of view of the durability and the quality or performance of the alternator. This causes insufficient generated energy especially in a range of low velocity revolution of the engine.

In order to set the ratio of the alternator speed to the engine speed arbitrarily, for example, Japanese Patent Publication No. sho 62-33465 proposes a mechanism for mechanically changing the diameter of the alternator driving pulley. However, such a mechanism for mechanically changing the speed causes a complicated and large-scale structure.

SUMMARY OF THE INVENTION

It is an object of the present invention to provide a generator system for internal combustion engines using an induction machine as an AC generator which can generate electric power efficiently irrespective of the engine r.p.m., without setting a high rotation ratio of the alternator to the engine r.p.m. and with a simple and compact structure.

The present invention is characterized in the following points.

(1) The generator system of the present invention uses an induction machine as an AC generator, and includes rotating electromagnetic field control means for generating a rotating electromagnetic field with an arbitrary speed N2 to multi-phase windings mechanically rotated at a speed N1 synchronously with the internal combustion engine operated at variable speeds, whereby the rotation speed N(=N1+N2) of the rotating magnetic field relative to the stator can be controlled arbitrarily by controlling the speed N2 of the rotating magnetic field.

(2) The rotating electromagnetic field control means controls the rotation speed N2 of the rotating electromagnetic field according to the mechanical rotation speed N1 of the rotor such that the relative speed N of the rotating magnetic field to the stator becomes a given value.

(3) The rotating electromagnetic field control means controls the rotation speed N2 of the rotating electromagnetic field according to the mechanical rotation speed N1 of the rotor such that the relative speed N of the rotating magnetic field to the stator approximates to the maximum efficiency speed of rotation Nx for the induction machine.

(4) The maximum efficiency speed of rotation Nx determined as a target value of the relative speed N is changed according to the mechanical rotation speed N1 of the rotor.

(5) There are provided DC magnetic field control means for selectively exciting the multi-phase windings of the rotor to generate a magnetic field, and selection means for selectively operating either of the rotating electromagnetic field control means and the DC excitation control means.

(6) There is further provided function switching means for making each output terminal of the stator short-circuited through each variable resistor or without such resistors so that the induction machine can be operated as a motor.

According to the characteristic (1), the generator can set any value of the relative speed N of the rotating magnetic field to the stator.

When the induction machine is used as a generator, the generator efficiency η exhibits the maximum efficiency η-max at a point Nx of a curve of the relative speeds N. It is therefore possible to produce electric power with the maximum efficiency, irrespective of the number of revolutions of the internal combustion engine, by controlling the rotation speed N2 of the rotating magnetic field according to the mechanical rotation speed N1 of the rotor, as shown in characteristics (2) and (3), such that the relative speed N agrees with the maximum efficiency speed of rotation Nx.

Although the maximum efficiency speed of rotation Nx for the generator is ideally set to a point Nx irrespective of the mechanical rotation speed N1 of the rotor, it actually exhibits a minute change corresponding to the change in the mechanical rotation speed N1 of the rotor due to adverse effects of the mechanical rotation of the rotor such as heating and mechanical losses in the fan. The present invention has the characteristic (4) to avoid such circumstances, where the maximum efficiency speed of rotation Nx determined as a target value of the relative speed N is changed according to the mechanical rotation speed N1 of the rotor. This allows the generator to produce electric power with the maximum efficiency at all times irrespective of the mechanical rotation speed N1 of the rotor.

The characteristic (5) is to operate the induction machine as a synchronous machine, and the characteristic (6) is to operate the generator as a motor.

DETAILED DESCRIPTION OF THE PREFERRED EMBODIMENT

Figure 4:
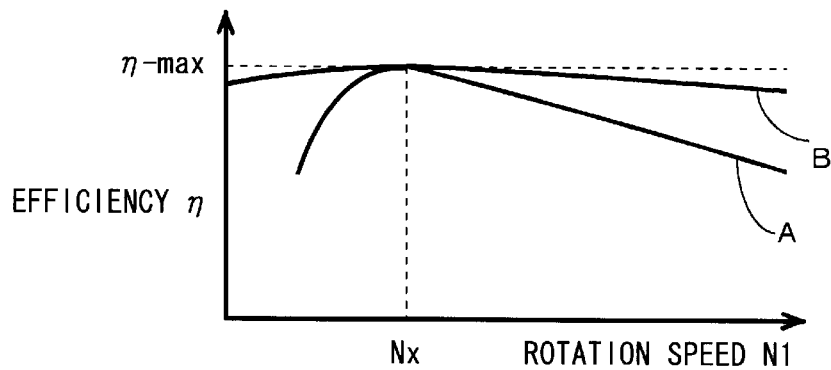
FIG. 4 is a graph showing the relationship between motor speed and efficiency.

The basic idea of the present invention will be first described. The relationship between rotation speed N1 and generator efficiency η for a conventional alternator using a synchronous machine is shown by a curve A in FIG. 4, where the maximum efficiency η-max appears at a point Nx of the rotation speeds N1, and the generator efficiency η is reduced as the engine r.p.m. is apart from the maximum efficiency speed of rotation Nx.

An effective rotation speed of an induction machine can be represented by a relative speed N of a rotating magnetic field generated by a rotor to a stator coil. The relative speed N is given by the following equation:

$$N = N1 + N2 \quad (1),$$

where N1 is a mechanical rotation speed of the rotor and N2 is an electrical rotation speed of the rotating magnetic field provided by the field coil of the rotor.

The relative speed N of the rotating magnetic field generated by the rotor to the stator coil in the induction machine will become faster than the mechanical rotation speed N1 of the rotor if the mechanical rotating direction of the rotor agrees with the rotating direction of the rotating field generated by the field coil of the rotor. If the directions become opposite to each other, on the contrary the relative speed N will be slower than the mechanical rotation speed N1 of the rotor. In a case such an induction machine is used as an alternator for vehicles, the relative speed N can be set equal to the maximum efficiency speed of rotation Nx at all times irrespective of the mechanical rotation speed N1 of the rotor by controlling the rotation speed N2 of the rotating magnetic field provided by the field coil according to the change in the mechanical rotation speed N1 of the rotor that depends on the engine speed. This makes it possible to operate the alternator with maintaining generator efficiency approximate to the maximum efficiency η-max at all times irrespective of the mechanical rotation speed N1 of the rotor as shown by a curve B in FIG. 4.

Figure 5:
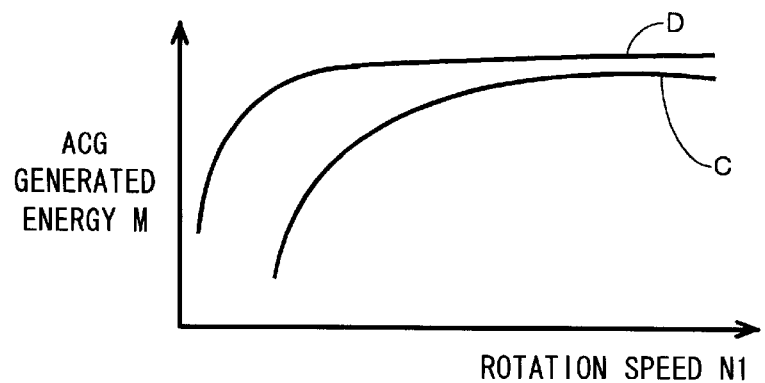
FIG. 5 is a graph showing the relationship between motor speed and generated energy.

From the same standpoint, when the generated energy M is taken into account instead of the generator efficiency η, as shown by a curve C in FIG. 5, the generated energy M of the alternator using a conventional synchronous machine is markedly reduced as the mechanical rotation speed N1 of the rotor decreases. In contrast, the use of the induction machine as the alternator provides any control of the relative speed N irrespective of the mechanical rotation speed N1 of the rotor. For this reason, sufficient electric power can be obtained, as shown by a curve D in FIG. 5, even when the mechanical rotation speed N1 of the rotor is in a range of low velocity revolution (e.g., 2000 r.p.m or less).

According to the present invention, the effective rotation speed (relative speed) N of the induction machine is controlled at a value at which the highest generator efficiency is expected, by taking into account such characteristics as the generator efficiency η of the induction machine exhibits the maximum efficiency η-max at a point Nx of the curve of the speeds N of the rotating magnetic field relative to the stator, and the relative speed N can be controlled at any value irrespective of the mechanical rotation speed N1 of the rotor by controlling the rotation speed N2 of the rotating magnetic field generated by the field coil of the rotor.

Figure 1:
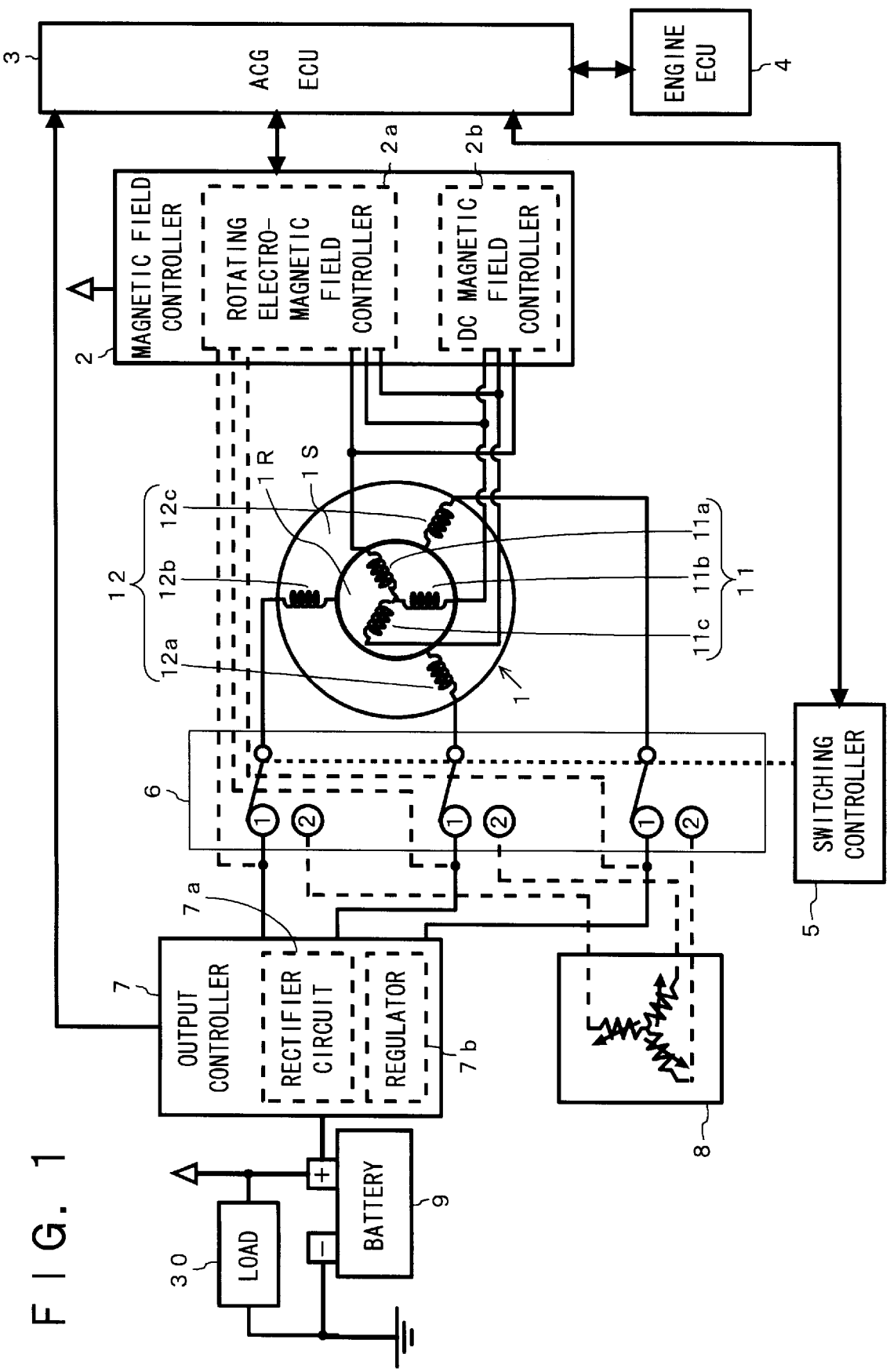
FIG. 1 is a block diagram of a generator system for vehicles according to an embodiment of the present invention.
Figure 2A:
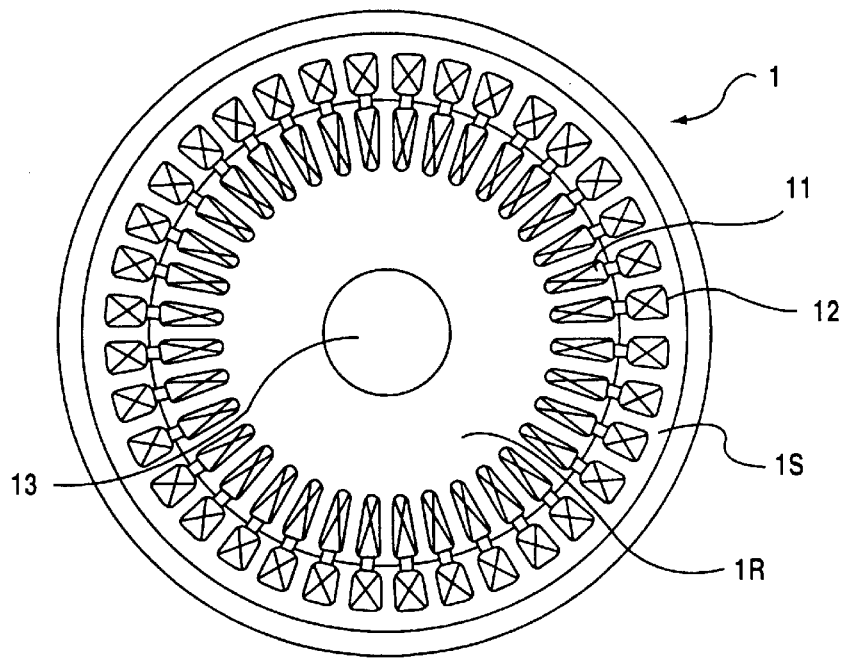
FIGS. 2A and 2B are diagrams showing a structure of an alternator according to the present invention.
Figure 2B:
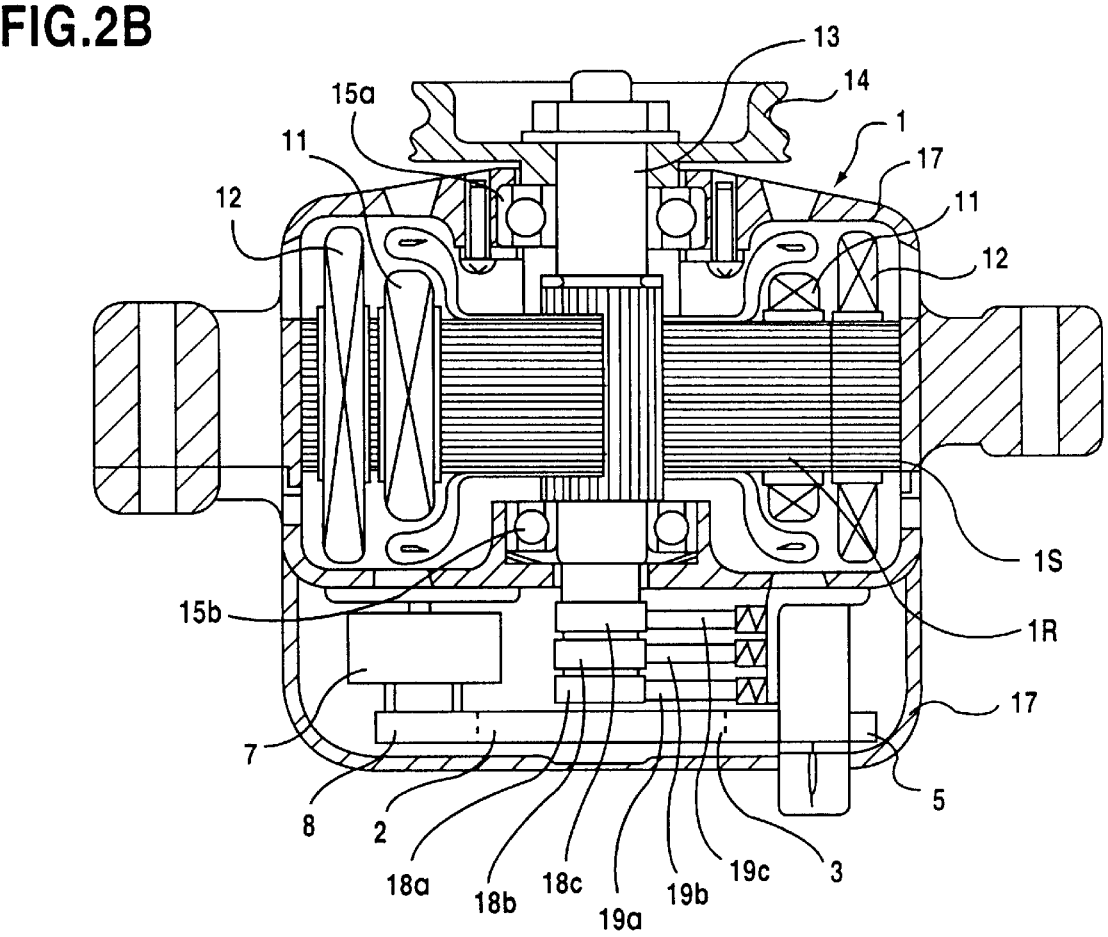
Figure 3:
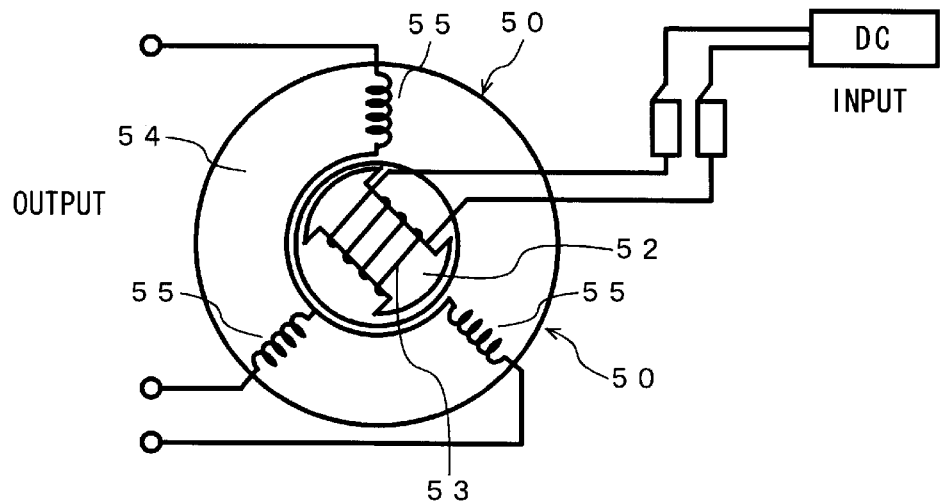
FIG. 3 is a schematic diagram showing an arrangement of main parts of a conventional alternator.

Referring next to the drawings, preferred embodiments of the present invention will be described. FIG. 1 is a block diagram showing an arrangement of main parts of a generator system for vehicles according to an embodiment of the present invention. FIGS. 2A and 2B show a structure of an alternator 1 constituting the generator system of the present invention. The alternator 1 of the present invention is an induction machine comprising rotor 1R and stator 1S where three-phase field coils 11 and three-phase armature windings 12 are formed, respectively.

In FIGS. 2A and 2B, the rotor 1R with the three-phase field coil 11 is coaxially fixed to a rotating shaft 13 of the alternator 1 and the stator 1S with the three-phase armature winding 12 is arranged around the rotor 1R. The rotating shaft 13 is rotatably supported in a housing 17 by a front bearing 15a and a rear bearing 15b. The rotating shaft 13 has a pulley 14 fixed at one end and slip rings 18a–18c formed at the other end to contact brushes 19a–19c for supplying exciting current to the field coils 11 (11a–11c) of the rotor 1R.

As will be described later, a magnetic field controller 2, an ACG.ECU (Electronic Control Unit) 3, a switching controller 5 and a short-circuit device 8 are also arranged inside the alternator housing 17 and at the other end of the rotating shaft 13. These devices 2, 3, 5 and 8 are disposed in the circumferential direction of the inside of the housing 17 and on a single plane perpendicular to the rotating shaft 13 (Preferably, on the inner surface of the housing 17). This makes it easier to wire between such devices and hence possible to ensure effective utilization of the dead space, thus preventing the alternator from increasing in size.

In FIG. 1, the ACG.ECU 3 communicates with an engine ECU 4 to detect parameters such as the engine speed Ne and the engine load.

On the basis of such parameters, the ACG.ECU 3 determines the rotation speed N2 of the rotating magnetic field to be generated in the rotor 1R, the voltage to be applied to the field coils and/or the phase of the rotating magnetic field to transmit to a rotating electromagnetic field controller 2a of the magnetic field controller 2. The rotating electromagnetic field controller 2a controls phase, amplitude and frequency of the AC power to be supplied to the field coils 11a, 11b and 11c of the rotor 1R based on the data such as the speed N2 of the rotating field sent from the ACG.ECU 3 so that the rotating electromagnetic field with the rotation speed N2 will be generated.

The switching controller 5 communicates with the ACG.ECU 3 to detect the operating state of the alternator 1 for each contacts as follows:

each output terminal of the alternator 1 is connected to each contact ① of an output controller 7 each time the alternator 1 is operated as a generator or to each contact ② of the short-circuit device 8 each time the alternator 1 is operated as a motor. In some cases, the switching controller 5 may resupply some of generated power for self-excitation to the alternator 1 through the rotating electromagnetic field controller 2a each time the alternator 1 is operated as a generator.

The output controller 7 is provided with rectifier circuit 7a and regulator 7b for converting AC power output from the alternator 1 into DC power corresponding to the voltage at the battery 9 and an electrical load 30. The short-circuit device 8 makes each output terminal of the armature windings 12a, 12b and 12c in the alternator 1 short-circuited either through each variable resistor or without such resistors. A DC magnetic field controller 2b is energized selectively instead of the rotating electromagnetic field controller 2a to supply a DC current to the field coils 11a and 11b of the rotor 1R so that a magnetic field will be generated in the rotor 1R.

In operation, the ACG.ECU 3 receives operational parameters such as the engine speed Ne and the engine load detected at the engine ECU 4 to calculate the mechanical rotation speed N1 of the rotor 1R in the alternator 1 based on the parameters such as the engine speed Ne and the pulley ratio. Then the ACG.ECU 3 determines the rotation speed N2 of the rotating electromagnetic field, based on the maximum efficiency speed of rotation Nx related to the alternator 1 and the mechanical rotation speed N1 received of the rotor, such that the speed N relative to the stator 1S agrees with the rotation speed Nx at which the maximum efficiency η-max can be obtained. The data representing the rotation speed N2 is sent to the rotating electromagnetic field controller 2a.

The rotating electromagnetic field controller 2a controls excitation timing in each phase of the three-phase coil 11 of the rotor 1R to generate a rotating magnetic field with the rotation speed N2. The AC power from each armature windings 12a, 12b and 12c of the stator 1S is converted into DC power in the output controller 7, where some of generated power is supplied to electrical load 30 and the remaining is charged to the battery 9. Since the control method for the induction machine itself is well known in the art, the description in more detail is omitted.

According to the present embodiment according to the present invention, the rotor 1R is always rotated with respect to the stator 1S in the alternator 1 with maintaining the maximum efficiency speed of rotation Nx. This allows the alternator 1 to generate the electric power at all times with generator efficiency approximate to the maximum efficiency η-max.

Although the maximum efficiency speed of rotation Nx for the generator is ideally set to a point Nx irrespective of the mechanical rotation speed N1 of the rotor 1R, the value of Nx intricately changes corresponding to the variation in the mechanical rotation speed N1 of the rotor 1R, in fact, due to adverse effects such as heating caused by the mechanical rotation of the rotor 1R and mechanical losses in the fan. It is therefore preferably to determine the maximum efficiency speed of rotation Nx to be a target value of the relative speed N as a function of the mechanical rotation speed N1 of the rotor 1R each time the generator is operated, or alternatively, to prestore possible values of the maximum efficiency speed of rotation Nx in a data table so as to select one of the prestored values based on the mechanical rotation speed N1 of the rotor 1R currently detected. This allows the generator to generate the electric power with the efficiency as approximate as possible to the maximum efficiency η-max.

When any factor disables the rotating electromagnetic field controller 2a from forming a rotating magnetic field in the rotor 1R, the ACG.ECU 3 detects that the generated energy is zero. Then the ACG.ECU 3 judges that a failure occurs in the rotating electromagnetic field controller 2a and outputs a DC excitation command to the DC magnetic field controller 2b. On receipt of the command, the DC magnetic field controller 2b supplies DC current from the battery 9 to the field coils 11a and 11b of the rotor 1R to induce a magnetic field in the rotor 1R. In this case, the alternator 1 serves as a synchronous machine to generate electric power in the same manner as the conventional.

The timing at which the DC exciting field is induced instead of the rotating magnetic field is not only when some failures occur in the rotating electromagnetic field controller 2a. For example, the exciting current may be directly supplied from the battery 9 to the field coils 11a and 11b at the start of power generation immediately after starting the engine with energizing a cell motor. This avoids the need for converting the DC current into the AC current to save losses generally accompanied with the voltage conversion.

Figure 6:
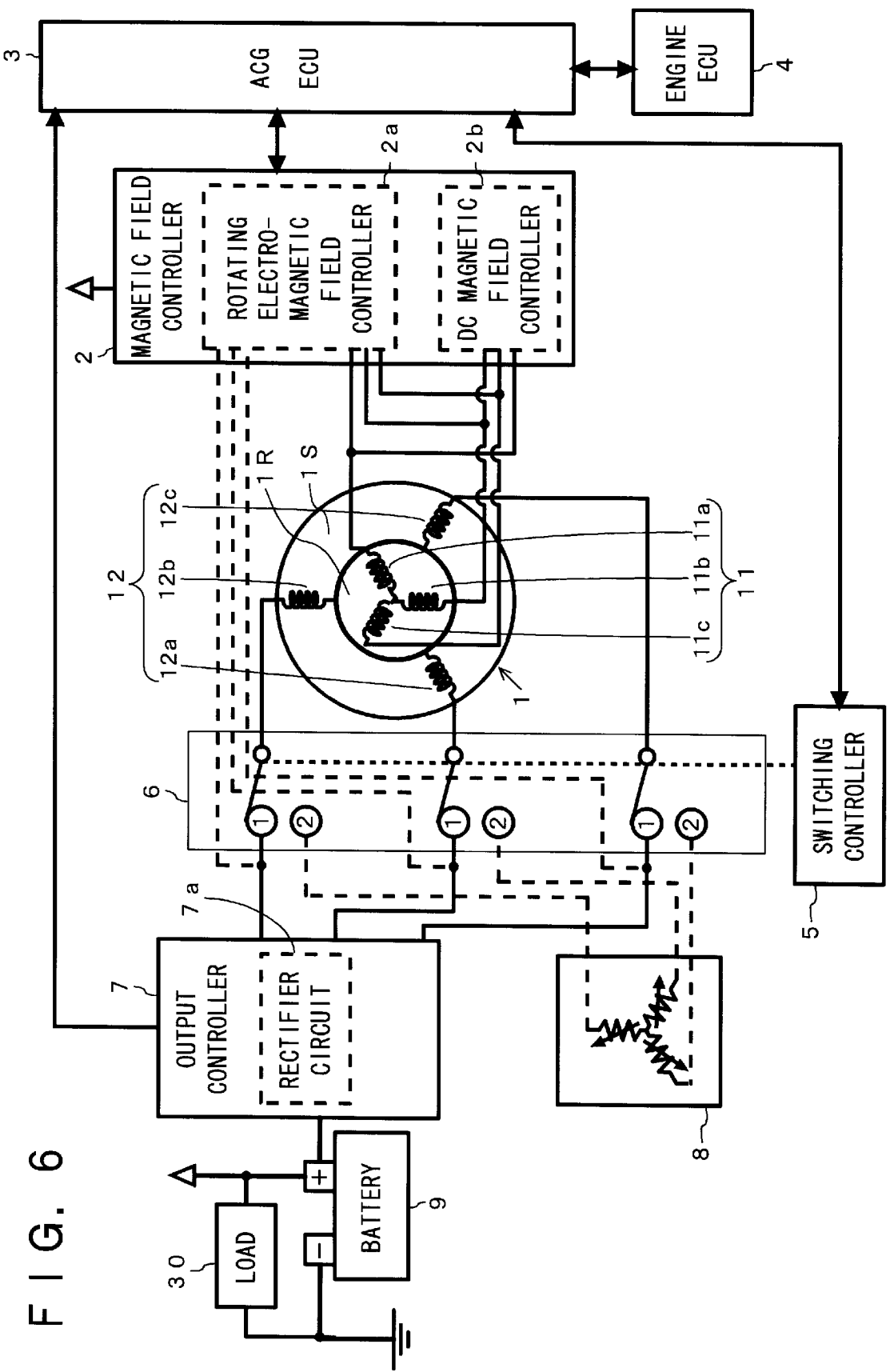
FIG. 6 is a block diagram of a generator system for vehicles according to another embodiment of the present invention.

Although in the embodiment above described the regulator 7b is provided in the output controller 7, some output voltage may be fed back to the ACG.ECU 3 so as to control the output voltage at the output controller 7 by controlling the rotation speed of the rotating magnetic field and/or the current in the field coils 11a~11c accordingly. In this case, such a regulator can be eliminated as shown in FIG. 6.

As previously described, since the rotor 1R in the alternator 1 is mechanically coupled to the crank shaft of the engine and rotated at all times even when the alternator is not required to generate power due to fully charged battery, rotation losses are caused by various factors such as belt driving torque and cooling fan resistance.

In the embodiments according to the present invention, the switching controller 5 detects that the battery 9 has been fully charged to eliminate the need for power generation. Then the switching controller 5 changes over from the contact ① to the contact ② on the side of the short-circuit device 8 so that each output terminal of the armature windings 12 will be short-circuited either through each variable resistor or without such resistors. At this time, the rotating electromagnetic field controller 2a generates a rotating magnetic field in the rotor 1R so that a driving torque will be created in a direction to aid the engine torque so as at least to compensate the rotation losses by the rotor 1R. Thus the alternator 1 serves as a motor for creating the torque to drive the engine, so that the rotation losses may be substantially canceled and the engine efficiency will be improved.

The timing at which the alternator 1 is operated as a motor is not only when the need for power generation is eliminated. For example, it may be operated as a motor when starting the engine with energizing the cell motor. In this case, the driving torque due to the cell motor is aided by the alternator 1 and the aided torque permits reduction in the cell motor size and quick engine start. The alternator 1 may also be operated as a motor when the vehicle is accelerating and this permits improvement of acceleration performance.

The rotating direction when the alternator 1 is operated as a motor is not only the direction to aid the engine driving torque. For example, the alternator 1 can also be used as a braking device by rotating the rotor 1R in the opposite direction when braking operation has been detected.

Although the above embodiments took the induction machine including three-phase windings type rotor and stator by way of example to describe the present invention, the present invention is not limited by the embodiments and any other multi-phase windings such as four- and five-phase windings may be used in the same manner.

The present invention provides the following advantages.

(1) Since an induction machine being smaller and having a simpler structure than a synchronous machine can be used as a generator for internal combustion engines operated at variable speeds, the use of such an induction machine as the alternator, permits reduction in size and weight of the vehicle or ship on which the alternator is mounted, thereby improving its driving performance.

(2) Through the control of the electrical rotation speed of the rotating magnetic field generated by the rotor, the rotation speed of the rotating electromagnetic field generated by the rotor in the induction machine can be controlled such that the generator is substantially run at any desired speed irrespective of the number of revolutions of the internal combustion engine used. Further, the control of the electrical rotation speed of the rotating magnetic field generated by the rotor permits sufficient power generation in lower revolution velocity as if in high revolution velocity without speeding up the mechanical rotation of the rotor. This avoids the need for reinforcement of the alternator to adapt to the high revolution velocity and thus permits reduction in the alternator size and weight. If a cooling fan is provided, the fan noise can also be reduced.

(3) The rotation speed of the rotating magnetic field generated in the rotor can be controlled such that the generator is run at the maximum efficiency speed of rotation irrespective of the r.p.m. of the internal combustion engine used, thereby generating electric power with high efficiency. If the rotation speed of the rotating magnetic field is corresponding to the variation in the maximum efficiency speed of rotation that slightly varies according to the variation in the mechanical rotation speed of the rotor, electric power generation is realized with higher efficiency.

(4) The generator can be used as either an inductive generator or a synchronous generator. It is therefore possible to operate the generator as a synchronous generator in the same manner as in the conventional whenever any fault disables the rotating electromagnetic field controller from forming a rotating magnetic field in the rotor.

(5) The rotation speed of the rotating magnetic field generated by the rotor can be controlled such that the generator is operated as a motor. For example, driving torque can be created in the direction to aid the engine driving torque so as to substantially cancel the rotation losses in the generator when the need for power generation is eliminated, thereby improving the efficiency of the internal combustion engine used.

What is claimed is:

1. A generator system for an internal combustion engine comprising:

an induction machine functioning as a generator/motor machine including rotor and stator with multi-phase windings in which the rotor is rotated by rotational motion of the internal combustion engine operated at variable speeds; and rotating electromagnetic field control means for supplying multi-phase alternating current to the multi-phase windings of said rotor, when said induction machine functions as a motor to generate a rotating electromagnetic field, wherein said rotating electromagnetic field control means controls a rotation speed of the rotating electromagnetic field according to a mechanical rotation speed of said rotor such that a relative speed of said induction machine, defined as a sum of the mechanical rotation speed of said rotor and the rotation speed of the rotating electromagnetic field is set to a predetermined value.

2. A generator system according to claim 1, wherein said rotating electromagnetic field control means controls the rotation speed of the rotating electromagnetic field according to the mechanical rotation speed of said rotor such that the predetermined value is a known maximum efficiency speed of rotation for said induction machine.

3. A generator system according to claim 2, wherein the maximum efficiency speed of rotation is determined as a function of the mechanical rotation speed of said rotor.

4. A generator system according to claim 1, further comprising:

DC magnetic field control means for exciting the multi-phase windings of said rotor to generate a DC magnetic field; and selection means for selectively operating one of said rotating electromagnetic field control means and the DC magnetic field control means.

5. A generator system according to claim 4, wherein said rotating electromagnetic field control means and said DC magnetic field control means are disposed within a housing of said induction machine.

6. A generator system according to claim 5, wherein one end of the rotating shaft of said induction machine is exposed to the outside of the housing of said induction machine for being transmitted the rotational motion from the internal combustion engine and the other end is not exposed to the outside, and said rotating electromagnetic field control means and said DC magnetic field control means are disposed in a space between an imaginary plane being perpendicular to the rotating shaft and including the other end of the rotating shaft, and an inner surface of the housing opposite to said other end of the rotating shaft.

7. A generator system according to claim 4, wherein said multi-phase windings include a plurality of output terminals, said system, further comprising function switching means for making each output terminal of the multi-phase windings of said stator short-circuited so that said induction machine operates as a motor.

8. A generator system according to claim 7, wherein said function switching means comprising:

a short-circuit means having input terminals thereof, said input terminals to be supplied with multi-phase current short-circuited each other; and switching means for selectively connecting each output terminal of the multi-phase windings of said stator to each input terminal of said short-circuit means, wherein said rotating electromagnetic field control means, said DC magnetic field control means, said selection means, said short-circuit means and said switching means are disposed in a space between an imaginary plane being perpendicular to the rotating shaft and including the other end of the rotating shaft, and an inner surface of the housing opposite to said other end of the rotating shaft.

9. A generator system according to claim 8, wherein said rotating electromagnetic field control means, said DC magnetic field control means, said selection means, said short-circuit means and said switching means are arranged circumferentially and along an inner surface of the housing.

10. A generator system according to claim 2, wherein said short-circuit means further comprises a plurality of resistors therein, and wherein said short circuit means is configured to have input terminals thereof supplied with multi-phase current short-circuited through the plurality of resistors.

11. A generator system according to claim 8, wherein said short-circuit means further comprises a plurality of resistors therein, and wherein said short circuit means makes its input terminals to be supplied with multi-phase current short-circuited through each resistor.

12. A generator system according to claim 1, wherein said rotating electromagnetic field control means is disposed within a housing of said induction machine.

13. A generator system according to claim 12, wherein one end of the rotating shaft of said induction machine is exposed to the outside of the housing of said induction machine for being transmitted the rotational motion from the internal combustion engine and the other end is not exposed to the outside, and said rotating electromagnetic field control means is disposed in a space between an imaginary plane being perpendicular to the rotating shaft and including the other end of the rotating shaft, and an inner surface of the housing opposite to said other end of the rotating shaft.

14. A generator system according to claim 1, wherein said multi-phase windings include a plurality of output terminals, said system further comprising function switching means for making each output terminal of the multi-phase windings of said stator short-circuited so that said induction machine operates as a motor.

* * * * *